(12) United States Patent
Curtis

(10) Patent No.: US 7,769,488 B2
(45) Date of Patent: Aug. 3, 2010

(54) RECONFIGURABLE STRUCTURE

(75) Inventor: Steven A. Curtis, Dayton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1035 days.

(21) Appl. No.: 11/108,627

(22) Filed: Apr. 8, 2005

(65) Prior Publication Data

US 2005/0247144 A1 Nov. 10, 2005

Related U.S. Application Data

(60) Provisional application No. 60/563,897, filed on Apr. 8, 2004, provisional application No. 60/566,226, filed on Apr. 23, 2004.

(51) Int. Cl.
*G06F 19/00* (2006.01)
(52) U.S. Cl. .................. 700/245; 700/188; 700/189; 700/248; 700/254; 180/8.1; 606/57; 414/226.01; 33/645
(58) Field of Classification Search .............. 700/248, 700/188, 189, 245, 254; 180/8.1; 33/645; 414/226.01; 606/57; 701/23; 74/490.06; 901/29
See application file for complete search history.

(56) References Cited

U.S. PATENT DOCUMENTS

| | | | |
|---|---|---|---|
| 5,361,186 A | 11/1994 | Tanie et al. | |
| 5,484,031 A | 1/1996 | Koyachi et al. | |
| 5,762,153 A | 6/1998 | Zamagni | |
| 6,233,503 B1 * | 5/2001 | Yim et al. | 700/245 |
| 6,243,622 B1 * | 6/2001 | Yim et al. | 700/245 |
| 6,477,444 B1 * | 11/2002 | Bennett et al. | 700/245 |
| 6,491,119 B1 | 12/2002 | Neu | |
| 6,636,781 B1 * | 10/2003 | Shen et al. | 700/248 |
| 6,648,583 B1 * | 11/2003 | Roy et al. | 414/735 |
| 6,671,582 B1 * | 12/2003 | Hanley | 700/245 |
| 6,671,975 B2 * | 1/2004 | Hennessey | 33/645 |
| 6,725,128 B2 * | 4/2004 | Hogg et al. | 700/245 |
| 6,741,912 B2 * | 5/2004 | Olesen et al. | 700/248 |
| 6,769,194 B2 * | 8/2004 | Hennessey | 33/645 |
| 6,943,519 B2 * | 9/2005 | Puchtler et al. | 318/567 |
| 7,104,746 B2 * | 9/2006 | Schwaar et al. | 414/735 |
| 7,337,691 B2 * | 3/2008 | Roy et al. | 74/490.06 |
| 2001/0054518 A1 | 12/2001 | Buehler et al. | |
| 2002/0059679 A1 * | 5/2002 | Weismiller et al. | 5/610 |
| 2005/0247144 A1 * | 11/2005 | Curtis | 74/83 |

OTHER PUBLICATIONS

Stankòczi, Development of a New Parallel Kinematics Machine Tool, 1999, Internet, p. 1-8.*
Wavering, Parallel Kinematic Machine Research at NIST: Past, Present, and Future, 1998, Internet, p. 1-13.*

(Continued)

*Primary Examiner*—Ronnie Mancho
(74) *Attorney, Agent, or Firm*—Matthew F. Johnston

(57) ABSTRACT

A reconfigurable structure includes a plurality of selectively extensible and retractable limbs, at least one node pivotably receiving respective ends of at least two limbs, and an actuator associated with each limb for extending and retracting the limb. The structure may further include an addressable module associated with each actuator to control the actuator.

57 Claims, 14 Drawing Sheets

OTHER PUBLICATIONS

Fitzgerald, Kinematic Analysis of a Stewart Platform Manipulator, 1993, IEEE, p. 282-293.*

Wavering, Parallel Kinematic Machine Research at NIST: Past, Present, and Future, 1998, Interenet, p. 1-13.*

Curtis, S.A. et al., ANTS: An Artificial Intelligence Approach to Asteriod Belt Resource Exploration, 51st International Astronautical Congress, Brazil, Oct. 2000.

Clark P.E. et al., Using ANTS to Explore Small Body Populations in the Solar System, American Astronomical Society's Division of Planetary Sciences, BAAS, vol. 33, No. 3, 2001.

Clark P.E. et al., ANTS: A New Concept for Very Remote Exploration With Intelligent Software Agents, American Geophysical Union, Dec. 10-14, 2001, EOS Trans.AGU,82 (47).

Clark P.E. et al., ANTS: Exploring the Solar System with an Autonomous Nanotechnology Swarm, Presentation 1394 at Lunar Planetary Science XXXIII, 2002.

Rilee M.L. et al, Onboard Science Software Enabling Future Space Science and Space Weather Missions, Paper 209, 2002 IEEE Aerospace Conference Big Sky, Montana,Mar. 9-16, 2002.

Clark P.E. et al., Revolutionizing Remote Exploration with ANTS, (abstract P521-01)Spring Meeting of the American Geophysical Union, 2002.

Curtis S.A. et al., Use of Swarm Intelligence in Spacecraft Constellations for the Resource Exploration of the Asteroid Belt, 3rd National Workshop, Italy, Feb. 24-26, 2003.

Curtis S.A et al., ANTS for the Human Exploration and Development of Space, IEEE Aerospace Conference Big Sky, MT Mar. 8-15, 2003.

Clark P.E. et al., In Situ Surveying of Saturn's Rings,2004 Lunar and Planetary Science Conference,Houston, Mar. 2004 (Poster).

Clark P.E. et al., From Present Surveying to Future Prospecting of the Asteroid Belt, 2004 Lunar and Planetary Science Conference,Houston, Mar. 2004 (Poster).

* cited by examiner

RECONFIGURABLE STRUCTURE

CROSS REFERENCE TO RELATED APPLICATIONS

This application claims the benefit of priority under 35 U.S.C. 119(e) of U.S. Provisional Patent Application No. 60/563,897 filed Apr. 8, 2004, entitled "Evolvable Neural Software System and Related Devices" and U.S. Provisional Patent Application No. 60/566,226 filed Apr. 23, 2004, entitled "Evolvable Neural Software System and Related Devices," each of which is incorporated herein by reference in its entirety.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

The present invention relates to a reconfigurable structure and, more particularly, to a structure that can change its form to optimize its function and/or adapt to contingencies.

2. Description of the Related Art

Structural systems that are uniquely configured and dedicated to carrying out a specific task or a narrow range of tasks are known in the art. These conventional systems include robotic structures that are configured to carry out an action in a particular way. In one example, mobile platforms, sometimes referred to as "rovers," are typically configured as wheeled vehicles or legged vehicles. Such vehicles may be used to explore, acquire data, or extract environmental samples in inhospitable environments, such as volcanic environments or on the surface of other planets. Such platforms may also be tasked with carrying out tasks that are too dangerous or otherwise not suitable for humans, such as disabling bombs.

A problem associated with these conventional systems is that they are unable to adapt to contingencies in their operating environments. As a result, relatively small variations in the operating environment may result in total system failure. For example, if a conventional wheeled vehicle or a legged vehicle tips over on uneven terrain, the vehicle is unable to right itself and continue to operate.

Another type of conventional systems include structural systems having dedicated components to carry out specific tasks. In one example, spacecraft are commonly designed to have dedicated structural components functioning as instruments, instrument supports, communication systems, and propulsion structures, such as solar sails.

A problem associated with these conventional systems is their inability to change their form or structure to optimize their performance or to adapt to contingencies that adversely affect their operation. For example, on conventional spacecraft, localized damage to an instrument boom, solar array, or portion of a solar sail caused by debris impact may cause failure of the component and/or the mission.

Thus, conventional robotic systems and other structural systems lack the ability to optimize their function and/or to adapt to contingencies in their operating environments.

SUMMARY OF EXEMPLARY ASPECTS

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

To overcome the drawbacks of the prior art and in accordance with the purpose of the invention, as embodied and broadly described herein, one aspect of the invention provides a reconfigurable structure including a plurality of selectively extensible and retractable limbs, at least one node pivotably receiving respective ends of at least two limbs, and an actuator associated with each limb for extending and retracting the limb.

In another aspect, the invention provides a reconfigurable structure including a plurality of nodes, a plurality of selectively extensible and retractable limbs, each limb having a first end and a second end pivotably received by respective nodes, an actuator associated with each limb for extending and retracting the limb, and an addressable module associated with each actuator to control the actuator. As used herein, "addressable" means discretely accessible by one or more media. The media used to address a given module may utilize one or more of an electrical signal, a fiber optic signal, a radio frequency signal, and an infrared signal. Media utilizing other types of signals may also be used.

In a further aspect, the invention provides a reconfigurable structure including a polyhedral frame. As used herein, "polyhedral frame" means a frame defining a plurality of faces. The polyhedral frame includes a plurality of selectively extensible and retractable limbs, a plurality of nodes, each node pivotably receiving respective ends of at least two limbs, a motor associated with each limb for extending and retracting the limb, and an addressable module associated with each actuator to control the motor. The limbs may define polyhedral subframes within the polyhedral frame.

Aside from the structural and procedural arrangements set forth above, the invention could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this specification, illustrate several exemplary embodiments of the invention and together with the description, serve to explain the principles of the invention. In the drawings.

DETAILED DESCRIPTION OF EXEMPLARY EMBODIMENTS

Reference will now be made in detail to an the exemplary embodiments of the invention, examples of which are illustrated in the accompanying drawings. Wherever possible, the same reference numbers will be used throughout the drawings to refer to the same or like parts.

The reconfigurable structure according to the present invention provides an arrangement in which a structure can change its form to optimize its function and/or adapt to contingencies arising in its operating environment. Some embodiments of the invention provide a scalable system ranging from a single polyhedral frame to a massively parallel system including multiple interconnecting polyhedral frames. Further, embodiments of the invention may be fabricated using a range of technologies, including mature electromechanical technologies, as well as microelectromechanical systems (MEMS) and nanoelectromechanical systems (NEMS) currently being developed.

In some embodiments, structures according to the invention include multiple polyhedral frames providing an undifferentiated architecture that can reconfigure into a variety of functions without the need for specialized structures or appendages. Other embodiments provide specialized attachments for robotic, on-orbit, spacecraft servicing. Still other embodiments provide gossamer reconfigurable structural frames for space payloads.

Figure 1:
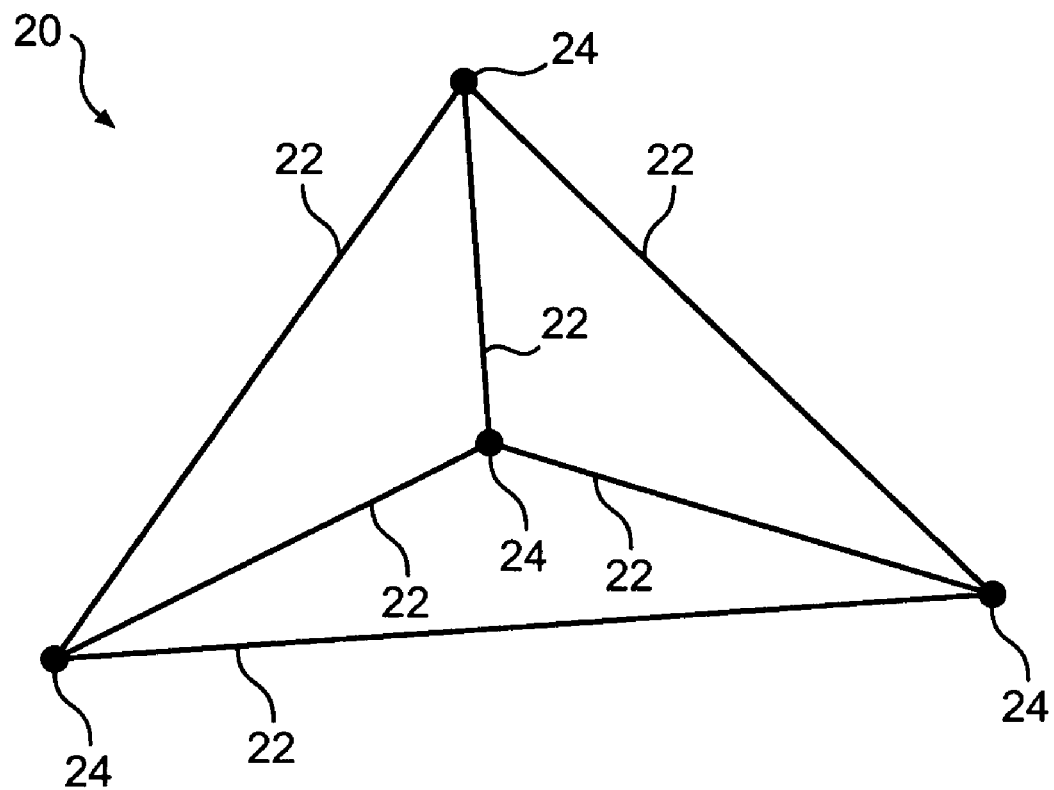
FIG. 1 is a schematic view of an embodiment of the reconfigurable structure of the present invention.

In one embodiment, the structure according to the present invention comprises a polyhedral frame 20, as shown in FIG. 1. The polyhedral frame comprises a plurality of selectively extensible and retractable limbs 22, at least one node 24 pivotably receiving respective ends of at least two limbs 22, and an actuator (not shown) associated with each limb for extending and retracting the limb 22.

In one embodiment, the polyhedral frame shown in FIG. 1 may be used as a rover, in which the variable length limbs 22 extend or retract to conform to terrain. The structure travels by selectively varying the length of respective limbs 22 to topple over in alternating directions in a controlled manner.

Figure 2:
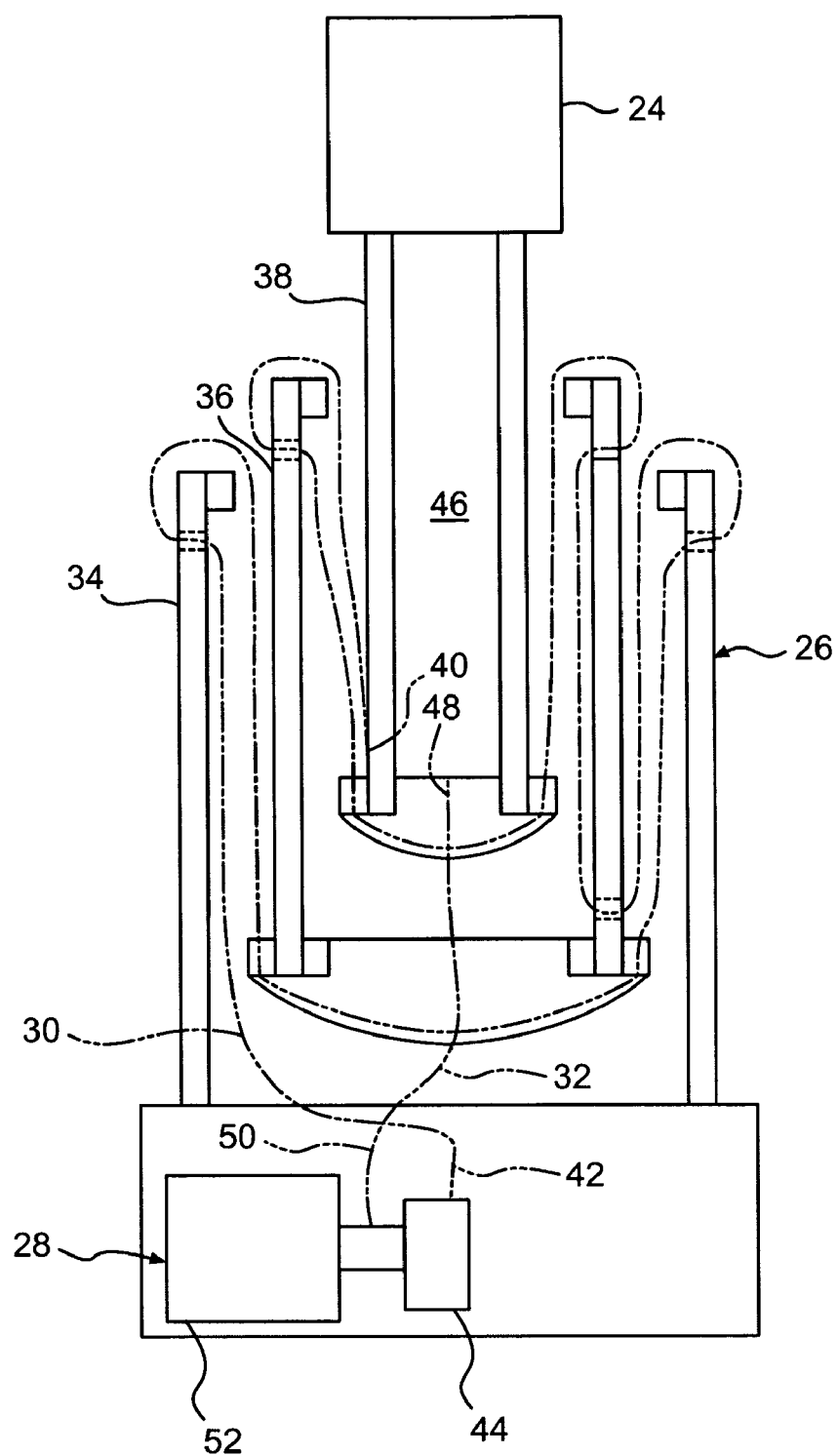
FIG. 2 is a schematic view of an embodiment of a limb and an actuator of the present invention.

According to one embodiment, each limb 22 comprises a telescoping shaft 26, as shown in FIG. 2. The telescoping shaft 26 may comprise at least one of steel, aluminum, titanium, alloys, composites, and polymers. The telescoping shaft 26 may comprise any of a range of other materials having suitable strength and weight characteristics.

As shown, the telescoping shaft 26 is driven by a cable and pulley actuator 28. The cable and pulley actuator 28 comprises a first cable element 30 and a second cable element 32. The first cable element 30 is strung through the shaft 26 so as to engage each of the shaft sections 34, 36, 38. A first end 40 of the first cable element 30 is connected to a distal section 38 of the shaft 26. A second end 42 of the first cable 30 is secured to a pulley 44. The second cable element 32 is disposed within the central opening 46 of the shaft 26. A first end 48 of the second cable element 32 is connected to the distal section 38 of the shaft 26. A second end 50 of the second cable element 32 is secured to the pulley 44.

The cable may comprise any of a range of materials having the appropriate size to fit within and between the shaft sections and the appropriate tensile strength to withstand the actuation loads associated with extending and retracting the shaft 26.

The pulley 44 stores a portion of the first and second cable elements 30, 32. The stored portion of the cable elements varies as the shaft 26 is extended and retracted. In one embodiment, the pulley 44 comprises separate respective winding portions to receive each cable element 30, 32.

The actuator 28 further comprises a motor 52 for operating the pulley 44. The motor 52 may be mounted on a respective limb 22 or on a node 24. Operation of the motor 52 in a first direction places tension on the first cable element 30 and extends the shaft 26, and operation of the motor 50 in a second direction places tension on the second cable element 32 and retracts the shaft 26. The cable and pulley actuator 28 causes the shaft segments 34, 36, 38 to extend and retract substantially simultaneously, thereby allowing for smooth movement of the structure. Actuators which act on the shaft segments sequentially may also be used.

Figure 3:
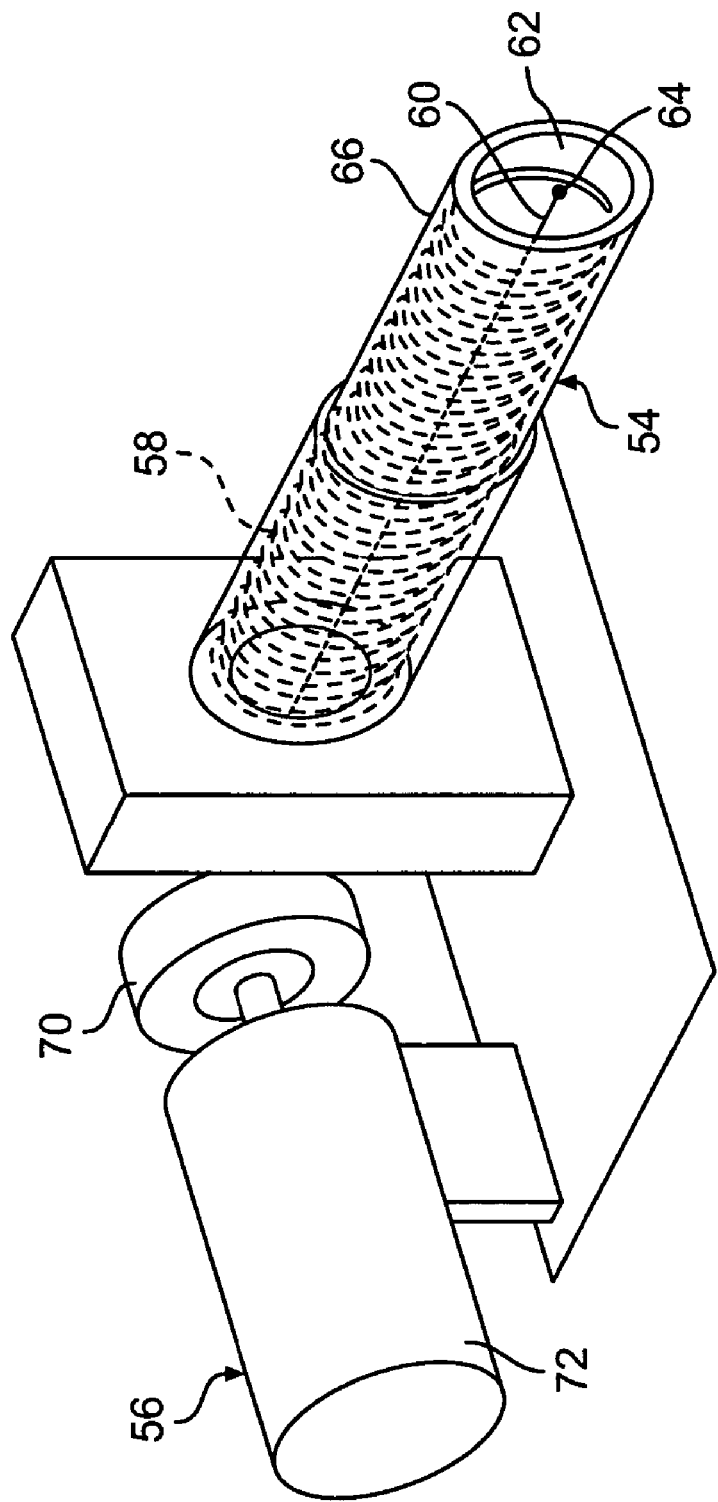
FIG. 3 is a schematic view of another embodiment of a limb and an actuator of the present invention.

In another embodiment, shown in FIG. 3, the telescoping shaft 54 is driven by a cable and spring actuator 56. The cable and spring actuator 56 comprises a spring element 58 biasing the shaft 54 to an extended position. A cable element 60 is disposed within the central opening 62 of the shaft 54. A first end 64 of the cable element 60 is connected to a distal section 66 of the shaft 54. A second end 68 of the cable element 60 is secured to a pulley 70, which stores a portion of the cable element 60.

The actuator 56 further comprises a motor 72 for operating the pulley 70. The motor 72 may be mounted on a respective limb 22 or on a node 74. In this embodiment, operation of the motor 72 in a first direction releases a portion of the cable element 60 from the pulley 70 and allows the shaft 54 to extend under the force of the spring 58. Operation of the motor 72 in a second direction places tension on the cable element 60 and retracts the shaft 54. Selective extension and retraction of the limbs 22 allows the structure to travel by toppling over in alternating directions in a controlled manner.

Figure 4:
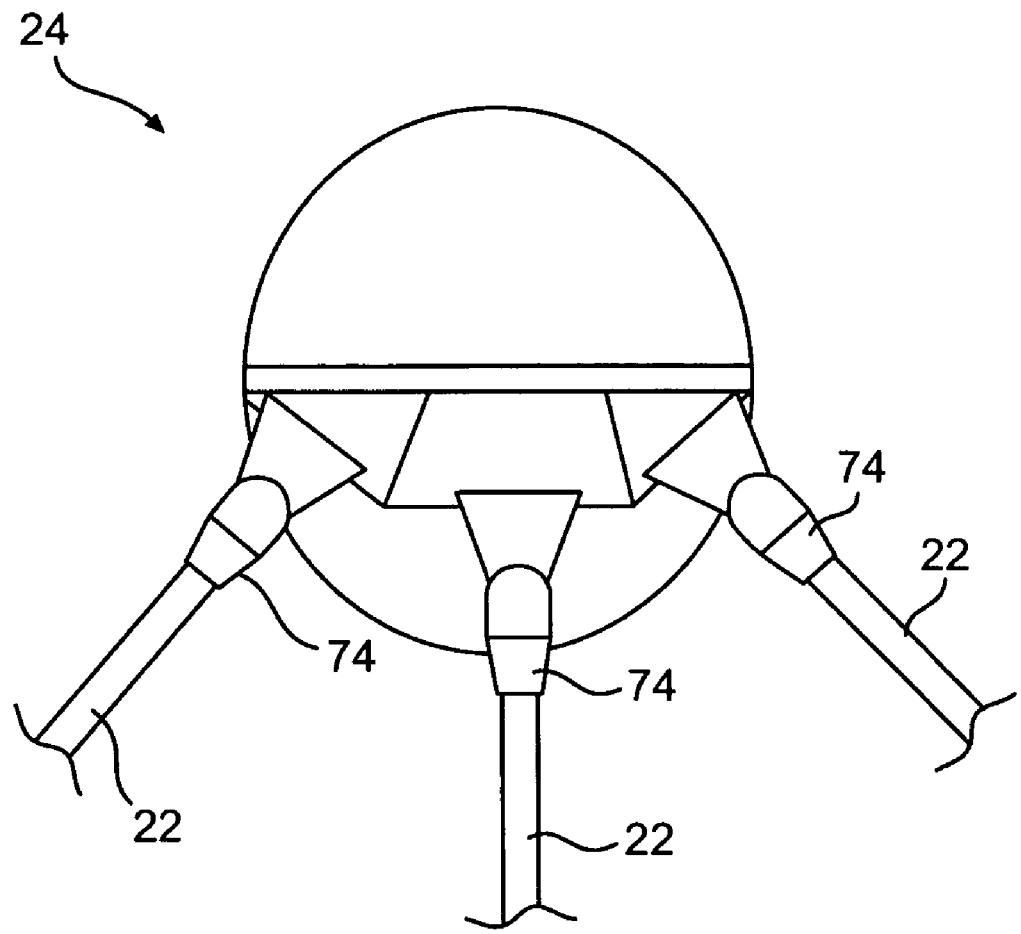
FIG. 4 is a schematic view of an embodiment of a node of the present invention.

The polyhedral frame shown in FIG. 1 comprises nodes 24 that pivotably receive ends of respective limbs 22. In one embodiment, shown in FIG. 4, each node 24 comprises a plurality of ball and socket joints 74 for pivotably receiving ends of respective limbs 22. Three ball and socket joints 74 are shown on the node 24 in FIG. 4, but nodes may be provided with a different number of joints to correspond to the number of limbs received by a given node.

Figure 5:
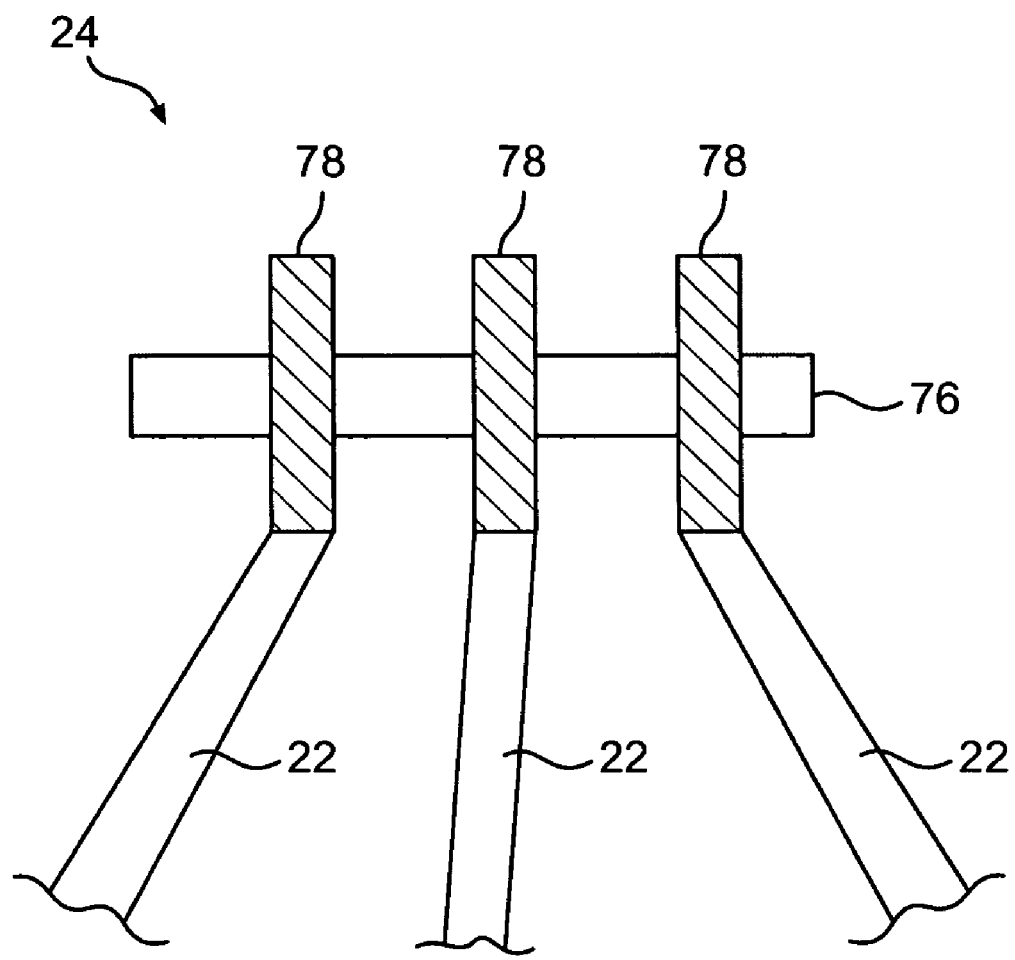
FIG. 5 is a schematic view of another embodiment of a node of the present invention.

FIG. 5 shows another embodiment, where each node 24 comprises a support element 76 and a plurality of pliant elements 78 disposed on the support element 76 for pivotably receiving ends of respective limbs 22. The pliant elements 78 may comprise resilient cables, spring elements, or other connections providing a desired amount of pivoting of the limbs with respect to the support element. Three pliant elements are shown on the node in FIG. 5, but nodes may be provided with a different number of pliant elements 78 to correspond to the number of limbs 22 received by a given node 24.

Figure 6:
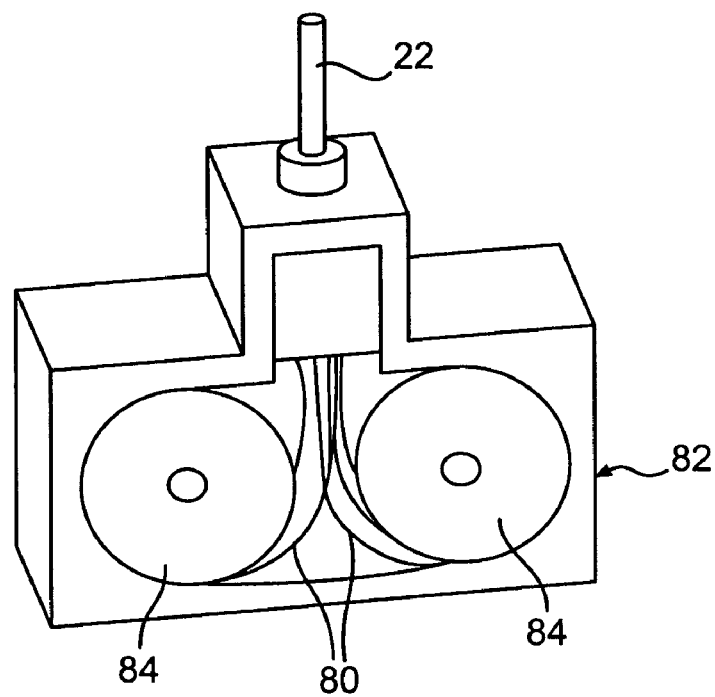
FIG. 6 is a is a schematic view of another embodiment of a limb and an actuator of the present invention.

In a further embodiment, each limb comprises at least one tape element 80. An embodiment of a limb 22 comprising two tape elements 80 is shown in FIG. 6, along with an associated actuator 82. The actuator 82 comprises a winding element 84 for storing a portion of each tape element 80 and a motor (not shown) for driving each winding element 84 to selectively store the tape element 80 and dispense the tape element 80. Storing and dispensing the tape element 80 corresponds to retracting and extending the respective limb 82. The motor for driving the winding elements 84 may utilize a belt drive or direct shaft drive. Other drive arrangements may also be used.

The two tape elements 80 are stored individually on respective winding elements 84 when the limb 22 is retracted. The tape elements 80 have a substantially flattened cross-section in the stored configuration on the winding elements 84. When the limb 22 is extended and the tape elements 80 are dispensed from the winding element 84, the tape elements 80 take on a rounded cross-section due to internal resiliency in the material of the tape element 80. Once the tape elements 80 are dispensed, they combine to form a substantially tubular limb 22. The limb 22 may have a cross-section other than circular, depending on the material characteristics. Further, a retaining element (not shown), such as a spring, for example, may be placed around the limb 22 to maintain the two tape elements 80 in an engaged configuration. The tape elements 80 may comprise at least one of steel, aluminum, titanium, alloys, composites, and polymers. Other materials may also be used.

In another embodiment, the tape elements 80 comprise carbon nanostructure elements. As with the tape elements described above, the carbon nanostructure tape elements substantially flatten when stored on the winding elements. When dispensed from the winding elements 84, the carbon nanostructure tape elements engage each other to form a substantially tubular limb 22. The carbon nanostructure tape elements may engage each other in zipper-like fashion. In this embodiment, the winding elements 84 and motor may comprise MEMS or NEMS devices.

Figure 7:
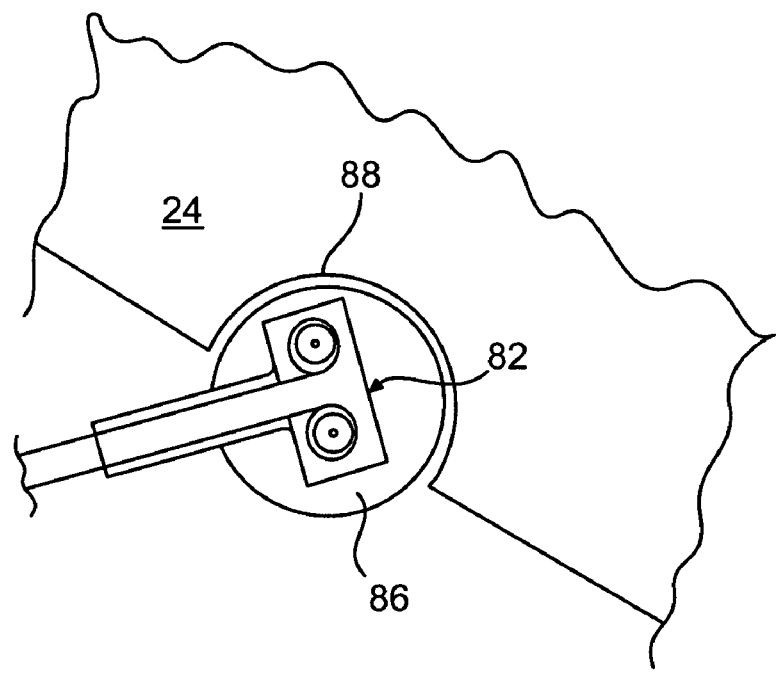
FIG. 7 is a schematic view of an embodiment of an actuator mounted on a node of the present invention.
Figure 8:
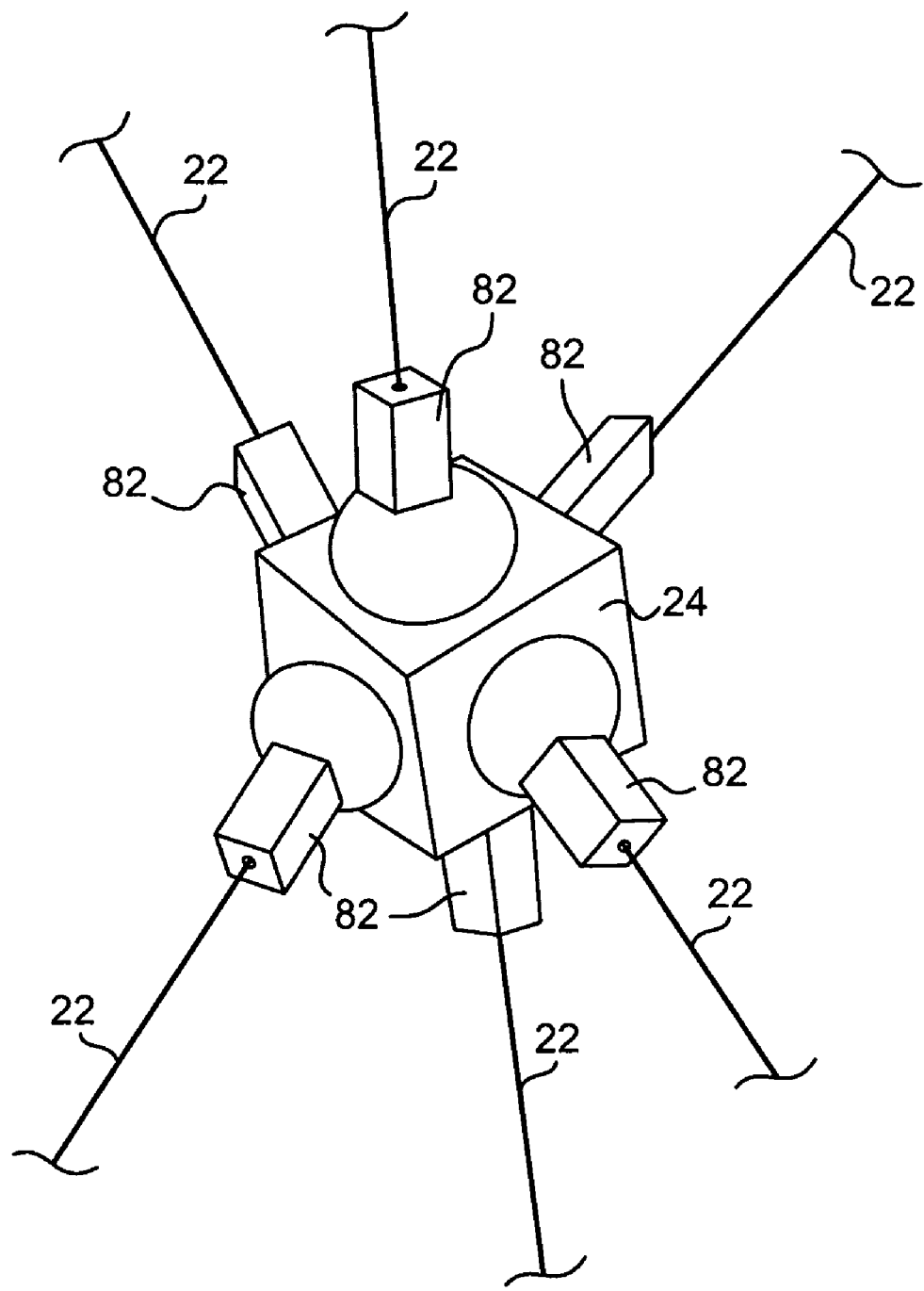
FIG. 8 is a schematic view of a node of the present invention.

The actuator associated with each limb 22 may be mounted on a respective limb 22 or on a node 24. FIG. 7 shows an embodiment in which an actuator 82 is pivotably mounted on a node 24. As shown, the actuator 82 is disposed on a pivoting ball 86 within a recess 88 on the node 24. Other pivoting arrangements may also be used. A given node 24 may accommodate multiple actuators 82, as shown in FIG. 8. The node 24 in FIG. 8 has six associated actuators 82. Nodes can be made to accommodate different numbers of actuators by varying their geometry to provide a greater number of facets.

Figure 9:
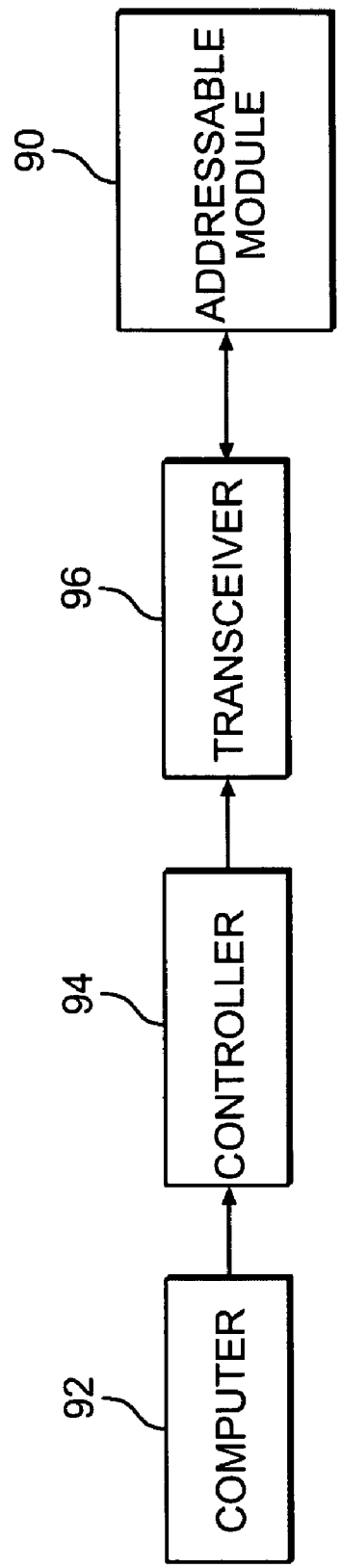
FIG. 9 is a block diagram of an embodiment of a control arrangement of the present invention.

In a further embodiment, the structure according to the present invention further comprises an addressable module 90 associated with each actuator 28, 56, 82 to control the actuator. The addressable module 90 controls the actuator 28, 56, 82 by receiving commands sent from a control computer 92, including a controller 94 and transceiver 96, optionally remote from the structure, as shown in FIG. 9.

Figure 10:
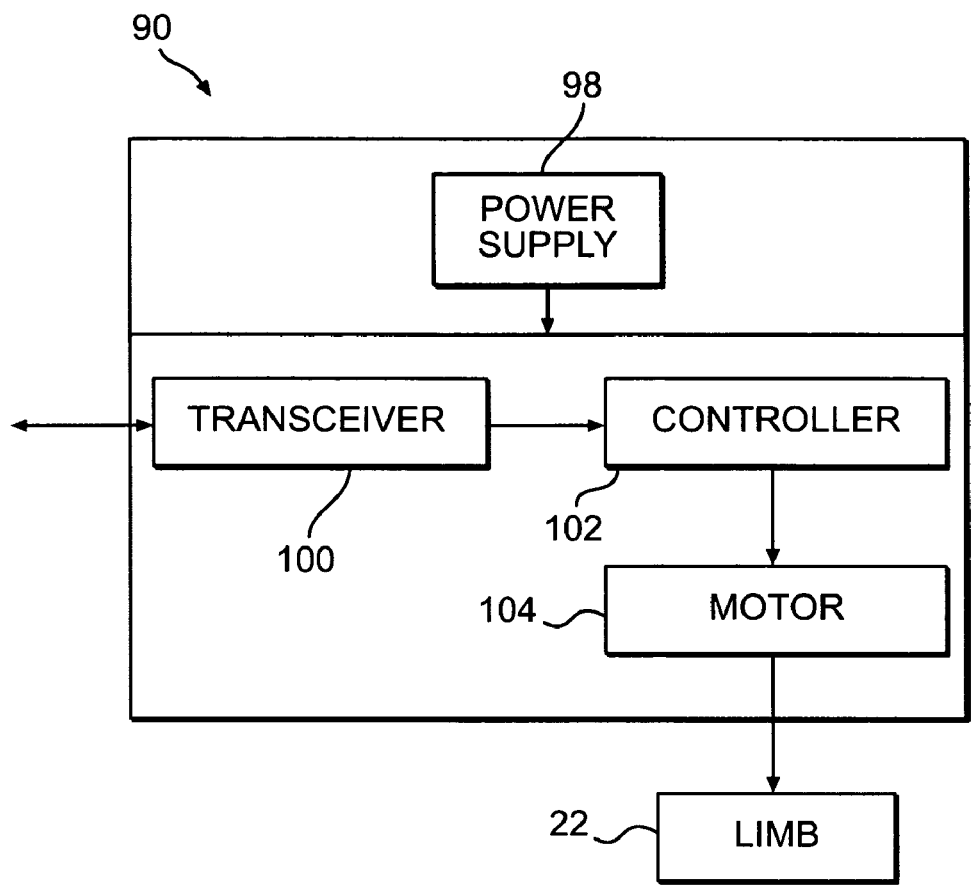
FIG. 10 is a schematic view of an embodiment of an addressable module of the present invention.

In yet another embodiment, the addressable module 90 comprises a power supply 98, a transceiver 100 to receive a command signal and a controller 102 to provide a control signal to drive the actuator, for example, a motor 104, in response to the command signal. A schematic diagram of this arrangement is shown in FIG. 10. The transceiver 100 may be configured to receive at least one of an electrical signal, a fiber optic signal, a radio frequency (RF) signal, and an infrared (IR) signal. Other types of signals may also be used.

Accordingly, in one embodiment, the structure of the present invention may be controlled using a joystick controller or other input device connected to the structure through a wire or fiber optic connection. In another embodiment, all of the addressable modules on the structure may be provided with a unique RF frequency tag, allowing for non-contacting, independent control of the structure. The addressable modules 90 may be disposed on a respective limb 22 or on a node 24.

Figure 11:
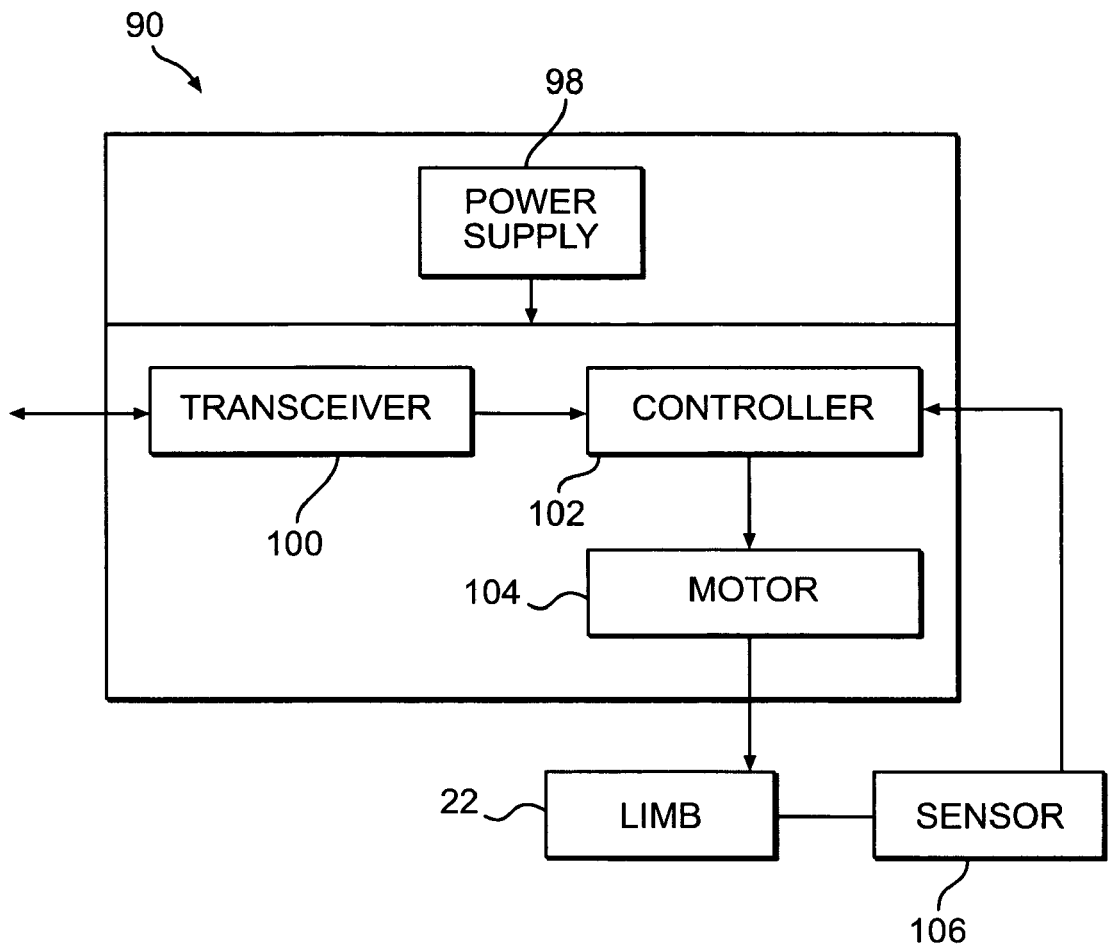
FIG. 11 is a schematic view of another embodiment of an addressable module of the present invention.

In a further embodiment, the structure further comprises at least one sensor 106 associated with each limb 22 providing feedback to the controller 102 on at least one parameter. The at least one parameter may be chosen from force, pressure, temperature, limb length, and limb attitude. Other parameters may also be measured. A schematic diagram of this arrangement is shown in FIG. 11. The information provided by the sensor 106 may enhance the operation of the structure while it carries out various activities.

Figure 12:
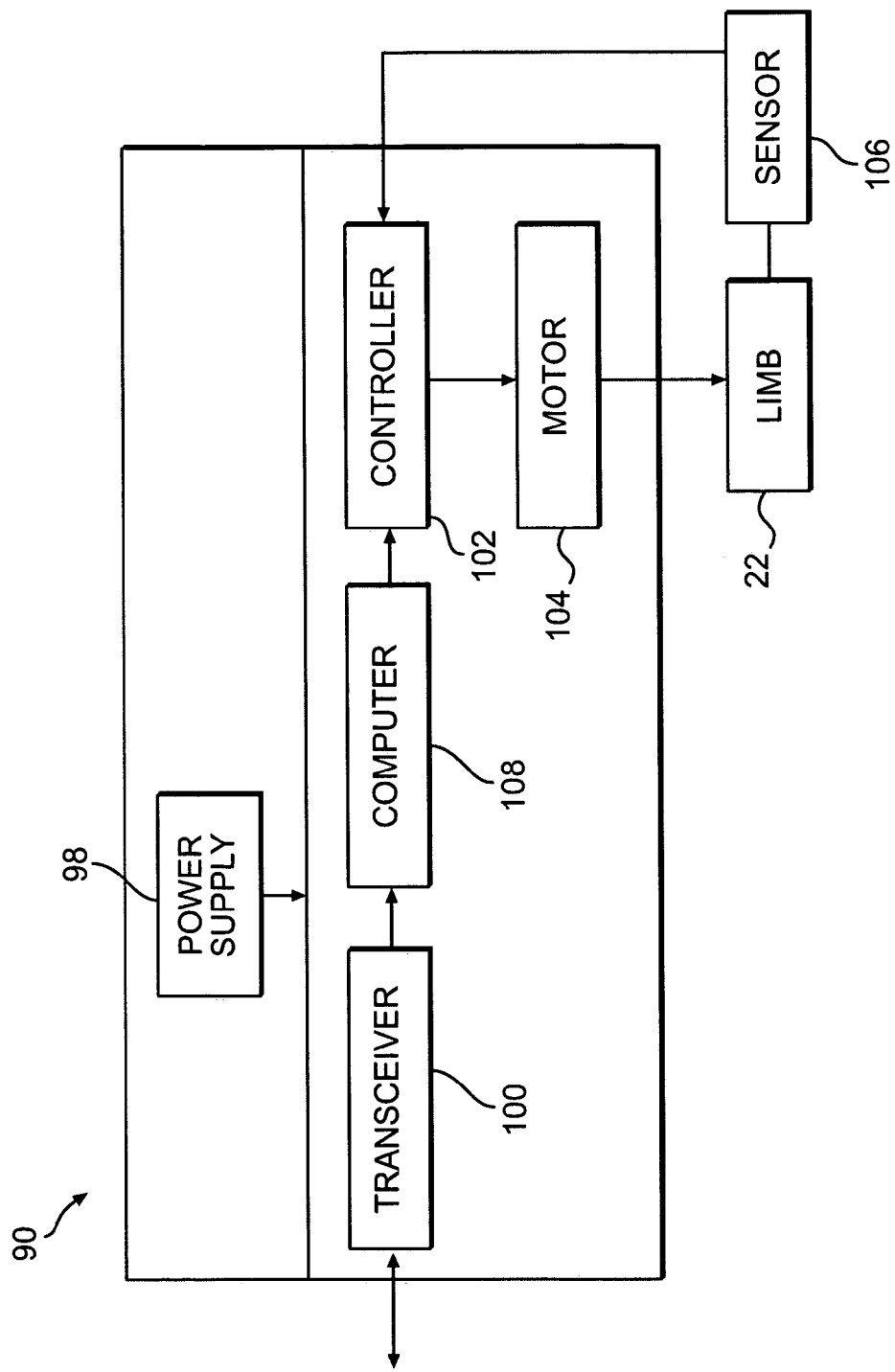
FIG. 12 is a schematic view of another embodiment of an addressable module of the present invention.

In a still further embodiment, shown in FIG. 12, the addressable module 90 associated with each motor comprises a power supply 98, a transceiver 100 to receive a first command signal, a computer 108 to provide a second command signal in response to the first command signal, and an associated controller 102. The associated controller 102 provides a control signal to drive the motor 104 in response to the second command signal. In another embodiment, the computer 108 further provides the second command signal to the controllers associated with other motors. In this arrangement, the reconfigurable structure of the present invention is equipped for autonomous operation. The computer may utilize an evolvable synthetic neural system in this arrangement, as described in a related application, U.S. application Ser. No. 11/109,400 filed Apr. 8, 2005, entitled "Evolvable Synthetic Neural System," which is incorporated herein by reference in its entirety.

Figure 13:
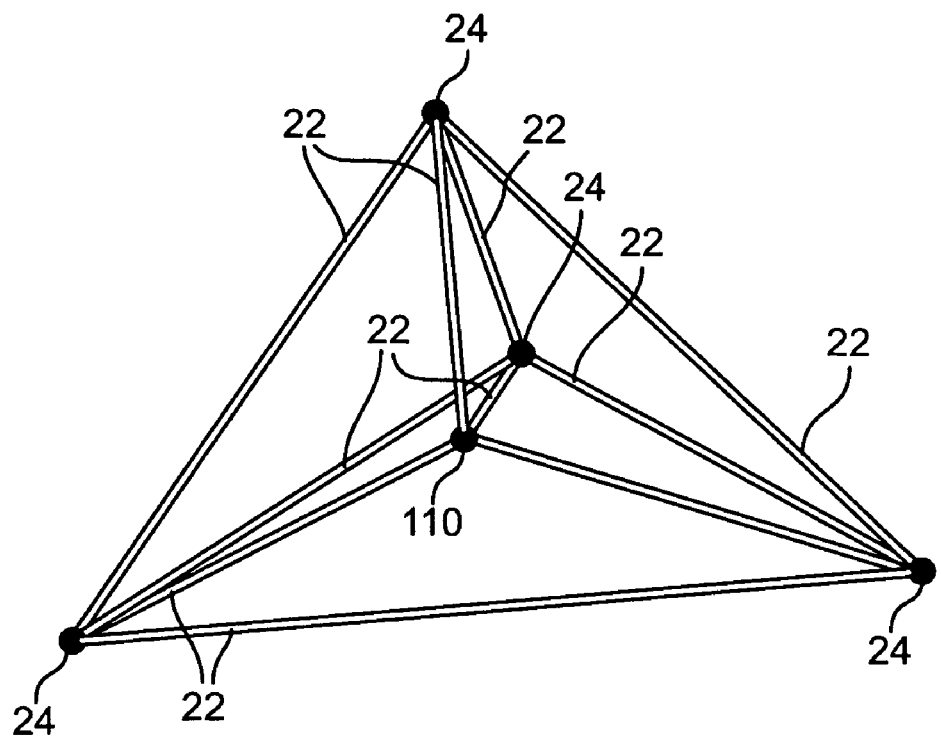
FIG. 13 is a schematic view of another embodiment of the reconfigurable structure of the present invention.
Figure 14:
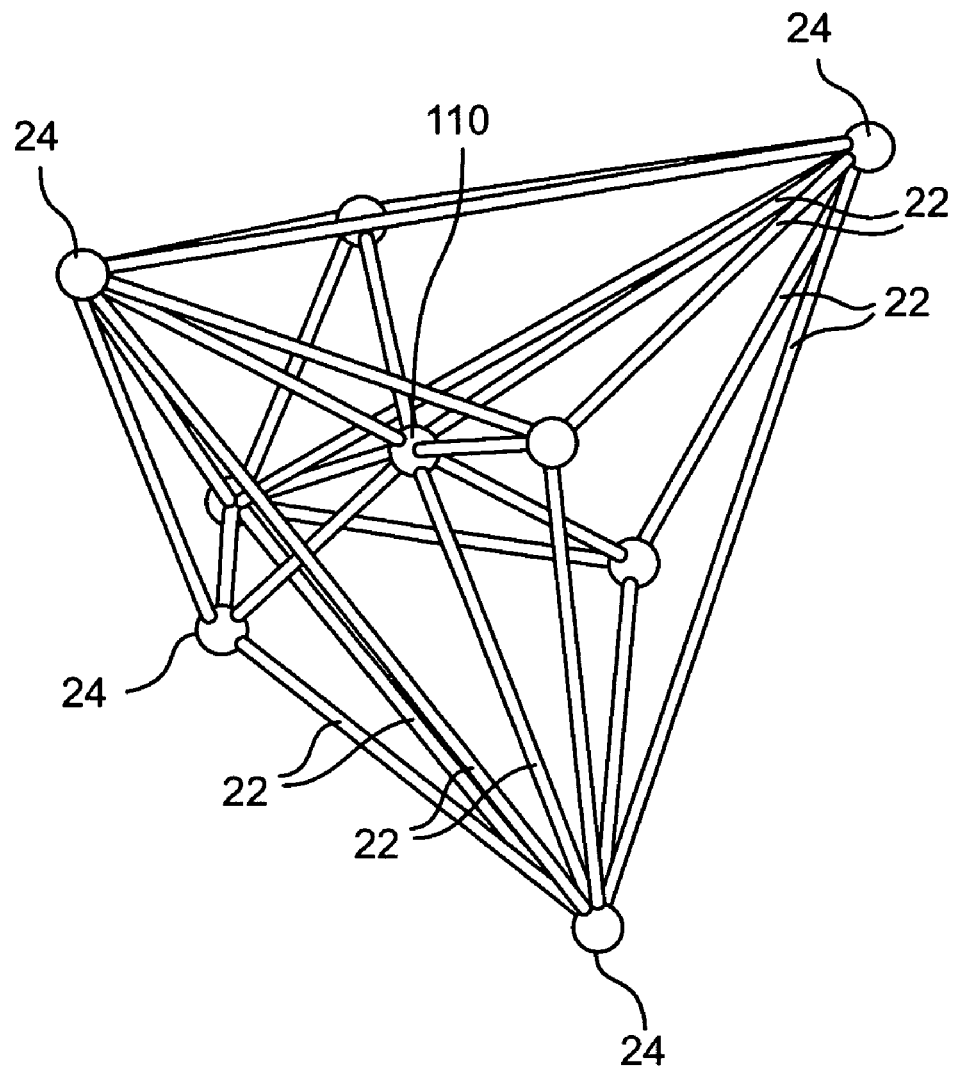
FIG. 14 is a schematic view of another embodiment of the reconfigurable structure of the present invention.

Further embodiments of the reconfigurable structure of the present invention are shown in FIGS. 13 and 14. As shown, each of these embodiments includes polyhedral subframes within the polyhedral frame, and a central node 110 that may be used for carrying instruments or other dedicated equipment. The protected location of the central node 110 makes it ideal for that purpose.

The increased number of nodes 24 and limbs 22 on the structure shown in FIG. 14 provides that structure with greater articulation than other embodiments possess. Due to the greater articulation, the structure of that embodiment may be capable of smoother motions and greater flexibility than other embodiments. Reconfigurable structures arranged as shown in FIG. 14 may be reconfigured to a substantially planar arrangement.

Figure 15:
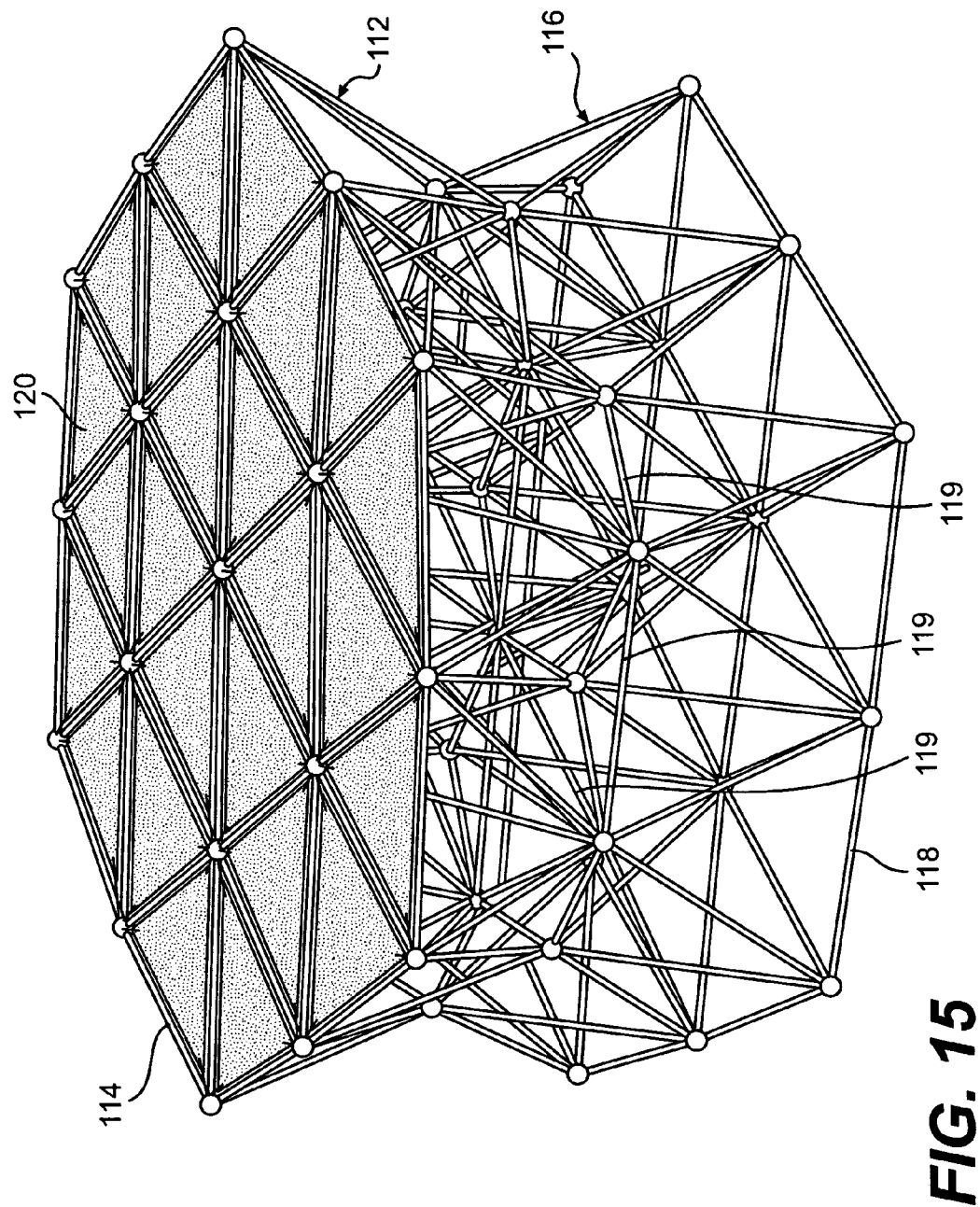
FIG. 15 is a schematic view of another embodiment of the reconfigurable structure of the present invention.

In the embodiment shown in FIG. 15, the reconfigurable structure of the present invention comprises a first plurality of polyhedral frames connected to adjacent polyhedral frames to form a first platform 112 defining a first substantially planar surface 114. The structure further comprises a second plurality of polyhedral frames connected to adjacent polyhedral frames to form a second platform 116 defining a second substantially planar surface 118. The second platform 116 is connected to the first platform 112 through intermediate limbs 119.

In this arrangement, the first substantially planar surface 114 and the second substantially planar surface 118 are substantially parallel. Further, the first substantially planar surface and the second substantially planar surface have a hexagonal shape. The polyhedral frames may also be arranged so that the planar surfaces have different shapes.

In one embodiment, a fabric 120 is disposed on the polyhedral frames defining one of the first substantially planar surface 114 and the second substantially planar surface 118 to form a solar sail. A similar arrangement may be used to form a telescope mirror. The fabric may comprise a polymer material. One type of polymer material used is a helical nanotubule dendritic polymer. Other materials may also be used.

In some embodiments the reconfigurable structure of the present invention may have a retracted volume significantly less than its extended volume. In one embodiment, the ratio of the length of an extended limb to the length of a retracted limb is approximately 3:1. In further embodiment, the ratio of the length of an extended limb to the length of a retracted limb is approximately 6:1. In a still further embodiment, the ratio of the length of an extended limb to the length of a retracted limb is greater than 50:1.

It will be apparent to those skilled in the art that various modifications and variations can be made to the structure and methodology described herein. Thus, it should be understood that the invention is not limited to the examples discussed in the specification. Rather, the present invention is intended to cover modifications and variations.

What is claimed is:

1. A reconfigurable structure, comprising:
a plurality of selectively extensible and retractable limbs;
a plurality of nodes each pivotably receiving respective ends of at least two of said plurality of selectively extensible and retractable limbs; and
a plurality of actuators each associated with a corresponding one of each and every limb for extending and retracting the limb; wherein at least one of said plurality of selectively extensible and retractable limbs is pivotably received by a corresponding one of said plurality of nodes at opposite ends thereof; wherein
the plurality of limbs and the at least one node form at least one three dimensional shape changing polyhedral frame including at least six limbs connected by at least three nodes thereby forming four faces; and wherein said at least one three dimensional shape changing polyhedral frame is void of a fixed length connection between any two of said at least three nodes.

2. The reconfigurable structure of claim 1, wherein every node is connected to every other node by at least one limb.

3. The reconfigurable structure of claim 1, wherein the plurality of limbs and the plurality of nodes form a plurality of polyhedral subframes within the three dimensional shape changing polyhedral frame.

4. The reconfigurable structure of claim 1, wherein each node comprises a plurality of ball and socket joints for pivotably receiving ends of respective limbs.

5. The reconfigurable structure of claim 1, wherein each node comprises: a support element; and a plurality of pliant elements disposed on the support element for pivotably receiving ends of respective limbs.

6. The reconfigurable structure of claim 1, wherein each limb comprises at least three telescoping shaft sections.

7. The reconfigurable structure of claim 6, wherein the ratio of the length of an extended limb to the length of a retracted limb is approximately 3:1.

8. The reconfigurable structure of claim 6, wherein the ratio of the length of an extended limb to the length of a retracted limb is approximately 6:1.

9. The reconfigurable structure of claim 6, wherein the ratio of the length of an extended limb to the length of a retracted limb is greater than 50:1.

10. The reconfigurable structure of claim 1, wherein the actuator associated with each limb is pivotably mounted on a node.

11. The reconfigurable structure of claim 10, wherein each limb comprises at least one tape element.

12. The reconfigurable structure of claim 11, wherein the actuator comprises: a winding element for storing a portion of each tape element; and a motor for driving each winding element to selectively store the tape element and dispense the tape element.

13. The reconfigurable structure of claim 12, wherein the at least one tape element comprises two tape elements.

14. The reconfigurable structure of claim 13, wherein the two tape elements form a substantially tubular limb when dispensed from the winding element.

15. The reconfigurable structure of claim 13, wherein the tape elements comprise at least one of steel, aluminum, titanium, alloys, composites, and polymers.

16. The reconfigurable structure of claim 13, wherein the tape elements comprise carbon nanostructure elements.

17. The reconfigurable structure according to claim 1, further including a plurality of interconnected polyhedral frames together forming at least one planar surface comprised of a plurality of interconnected faces.

18. A reconfigurable structure, comprising: a plurality of limbs each and every one of said limbs being selectively extensible and retractable; at least one node pivotably receiving respective ends of at least two of said plurality of limbs; and an actuator associated with said each and every one of said limbs for extending and retracting the limb; wherein the actuator associated with each limb comprises a motor; and the plurality of limbs and the at least one node form a three dimensional shape changing polyhedral frame including at least six limbs connected by at least three nodes thereby forming four faces; and wherein said at least one three dimensional shape changing polyhedral frame is void of a fixed length connection between any two of said at least three nodes.

19. The reconfigurable structure of claim 18, further comprising an addressable module associated with each and every motor, the addressable module comprising: a transceiver to receive a command signal; and a controller to provide a control signal to drive the motor in response to the command signal.

20. The reconfigurable structure of claim 19, wherein the transceiver is configured to receive at least one of an electrical signal, a fiber optic signal, a radio frequency signal, and an infrared signal.

21. The reconfigurable structure of claim 19, wherein each addressable module is disposed on a node.

22. The reconfigurable structure of claim 21, wherein each actuator is disposed on a respective limb.

23. The reconfigurable structure of claim 19, wherein each addressable module is disposed on a limb.

24. The reconfigurable structure of claim 19, further comprising at least one sensor associated with each limb providing feedback to the controller on at least one parameter.

25. The reconfigurable structure of claim 24, wherein the at least one parameter is chosen from force, pressure, temperature, limb length, and limb attitude.

26. The reconfigurable structure of claim 6, wherein the telescoping shaft comprises at least one of steel, aluminum, titanium, alloys, composites, and polymers.

27. The reconfigurable structure according to claim 18, wherein said each and every limb is identical.

28. The reconfigurable structure according to claim 27, wherein said structure is scalable to be reconfigured in identical shapes of different sizes.

29. A reconfigurable structure, comprising:
a plurality of selectively extensible and retractable limbs;
at least one node pivotably receiving respective ends of at least two limbs; and an actuator associated with each limb for extending and retracting the limb wherein each limb comprises a telescoping shaft; and wherein each actuator comprises: a first cable element engaging each section of the shaft; a second cable element connected to a distal section of the shaft; a pulley for storing a portion of the cable elements; and a motor for operating the pulley, wherein operation of the motor in a first direction places tension on the first cable element and extends the shaft, and operation of the motor in a second direction places tension on the second cable element and retracts the shaft; and wherein the plurality of retractable limbs and the at least one node form a three dimensional shape changing polyhedral frame including at least six limbs connected by at least three nodes thereby forming four faces; and wherein said at least one three dimensional shape changing polyhedral frame is void of a fixed length connection between any two of said at least three nodes.

30. A reconfigurable structure, comprising:
a plurality of selectively extensible and retractable limbs;
at least one node pivotably receiving respective ends of at least two limbs; and
an actuator associated with each limb for extending and retracting the limb wherein each limb comprises a telescoping shaft; and
wherein each actuator comprises: a spring element biasing the shaft to an extended position; a cable element connected to a distal section of the shaft; a pulley for storing a portion of the cable element; and a motor for operating the pulley, wherein operation of the motor in a first direction releases a portion of the cable element from the pulley and allows the shaft to extend under the force of the spring, and operation of the motor in a second direction places tension on the cable element and retracts the shaft; and
wherein the plurality of retractable limbs and the at least one node form a three dimensional shape changing polyhedral frame including at least six limbs connected by at least three nodes thereby forming four faces; and wherein said at least one three dimensional shape changing polyhedral frame is void of a fixed length connection between any two of said at least three nodes.

31. A reconfigurable structure, comprising:
a plurality of nodes;
a plurality of selectively extensible and retractable limbs, each limb having a first end and a second end pivotably received by respective nodes;
an actuator associated with each limb for extending and retracting the limb; and
an addressable module associated with each actuator to control the actuator and
wherein the plurality of selectively extensible and retractable limbs and the plurality of nodes form a three dimensional shape changing polyhedral frame including at least six limbs connected by at least three nodes thereby forming four faces; and wherein said at least one three dimensional shape changing polyhedral frame is void of a fixed length connection between any two of said plurality of nodes.

32. The reconfigurable structure of claim 31, wherein the plurality of nodes and the plurality of limbs form at least one polyhedral frame.

33. The reconfigurable structure of claim 32, wherein the plurality of nodes and the plurality of limbs form a plurality of polyhedral subframes within the polyhedral frame.

34. The reconfigurable structure of claim 31, wherein the actuator associated with each limb comprises a motor.

35. The reconfigurable structure of claim 34, wherein the addressable module associated with each motor comprises: a transceiver to receive a command signal; and a controller to provide a control signal to drive the motor in response to the command signal.

36. The reconfigurable structure of claim 35, wherein the transceiver is configured to receive at least one of an electrical signal, a fiber optic signal, a radio frequency signal, and an infrared signal.

37. The reconfigurable structure of claim 34, wherein the addressable module associated with each motor comprises: a transceiver to receive a first command signal; a computer to provide a second command signal in response to the first command signal; and an associated controller to provide a control signal to drive the motor in response to the second command signal, wherein the computer provides the second command signal to the controllers associated with other motors in addition to the associated controller.

38. The reconfigurable structure of claim 37, wherein the reconfigurable structure is equipped for autonomous operation.

39. The reconfigurable structure of claim 37, wherein the computer utilizes an evolvable synthetic neural system.

40. The reconfigurable structure of claim 31, wherein each addressable module is disposed on a respective node.

41. The reconfigurable structure of claim 40, wherein each actuator is disposed on a respective node.

42. The reconfigurable structure of claim 40, wherein each actuator is disposed on a respective limb.

43. The reconfigurable structure of claim 31, wherein each addressable module and each actuator are disposed on a respective limb.

44. The reconfigurable structure of claim 31, wherein each limb comprises one of a telescoping shaft and at least one tape element.

45. A reconfigurable structure, comprising:
a polyhedral frame, comprising:
a plurality of selectively extensible and retractable limbs;
a plurality of nodes, each node pivotably receiving respective ends of at least two limbs;
a motor having an actuator associated with each limb for extending and retracting the limb; and
an addressable module associated with each actuator to control the motor; and
wherein the plurality of selectively extensible and retractable limbs and the plurality of nodes form a three dimensional shape changing polyhedral frame including at least six limbs connected by at least three nodes thereby forming four faces; and wherein said at least one three dimensional shape changing polyhedral frame is void of a fixed length connection between any two of said plurality of nodes.

46. The reconfigurable structure of claim 45, wherein the addressable module associated with each motor comprises: a transceiver to receive a command signal; and a controller to provide a control signal to drive the motor in response to the command signal.

47. The reconfigurable structure of claim 46, wherein each addressable module is disposed on a respective node.

48. The reconfigurable structure of claim 47, wherein each motor is disposed on a respective node.

49. The reconfigurable structure of claim 47, wherein each motor is disposed on a respective limb.

50. The reconfigurable structure of claim 46, wherein each addressable module and each motor are disposed on a respective limb.

51. The reconfigurable structure of claim 45, wherein the plurality of limbs and the plurality of nodes form a plurality of polyhedral subframes within the polyhedral frame.

52. The reconfigurable structure of claim 45, further comprising:
   a first plurality of polyhedral frames connected to adjacent polyhedral frames to form a first platform defining a first substantially planar surface; and
   a second plurality of polyhedral frames connected to adjacent polyhedral frames to form a second platform defining a second substantially planar surface, wherein the second platform is connected to the first platform through intermediate limbs.

53. The reconfigurable structure of claim 52, wherein the first substantially planar surface and the second substantially planar surface are substantially parallel.

54. The reconfigurable structure of claim 52, wherein the first substantially planar surface and the second substantially planar surface have a hexagonal shape.

55. The reconfigurable structure of claim 52, wherein a fabric is disposed on one of the first substantially planar surface and the second substantially planar surface to form a solar sail.

56. The reconfigurable structure of claim 55, wherein the fabric comprises a polymer material.

57. The reconfigurable structure of claim 56, wherein the polymer comprises a helical nanotubule dendritic polymer.

* * * * *